(12) United States Patent
Cheng et al.

(10) Patent No.: US 10,852,778 B2
(45) Date of Patent: Dec. 1, 2020

(54) ELECTRONIC DEVICE

(71) Applicant: Compal Electronics, Inc., Taipei (TW)

(72) Inventors: Chien-Chih Cheng, Taipei (TW); Hung-Jui Lin, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 16/660,837

(22) Filed: Oct. 23, 2019

(65) Prior Publication Data
US 2020/0125146 A1 Apr. 23, 2020

Related U.S. Application Data

(60) Provisional application No. 62/749,652, filed on Oct. 23, 2018.

(51) Int. Cl.
G06F 1/16 (2006.01)

(52) U.S. Cl.
CPC .......... G06F 1/1681 (2013.01); G06F 1/1624 (2013.01)

(58) Field of Classification Search
CPC .... G06F 1/1681; G06F 1/1624; G06F 1/1622; G06F 1/1649; G06F 1/162
See application file for complete search history.

(56) References Cited

U.S. PATENT DOCUMENTS

| 6,256,017 | B1* | 7/2001 | Bullister | G06F 1/1616 345/168 |
| 6,302,612 | B1* | 10/2001 | Fowler | F16C 11/06 16/224 |
| 6,643,124 | B1* | 11/2003 | Wilk | G06F 1/1616 312/223.1 |
| 7,633,744 | B2* | 12/2009 | Kuhn | G06F 1/1622 361/679.04 |
| 8,018,715 | B2* | 9/2011 | Chang | G06F 1/1624 361/679.04 |
| 8,922,994 | B2* | 12/2014 | Zawacki | G06F 1/1679 361/679.57 |
| 2003/0231464 | A1* | 12/2003 | Weng | G06F 1/1632 361/679.41 |
| 2004/0223293 | A1* | 11/2004 | Nakano | G06F 1/1632 361/679.43 |

(Continued)

FOREIGN PATENT DOCUMENTS

| CN | 108459732 A | 8/2018 |
| TW | I270618 B | 1/2007 |

Primary Examiner — Abhishek M Rathod

(57) ABSTRACT

An electronic device includes a first body, a second body and a hinge assembly. The hinge assembly includes a bearing base, a movable base, a first hinge mechanism, a second hinge mechanism and a switching member. The bearing base is connected to the first body and has a first engaging portion. The first hinge mechanism is connected between the movable base and the second body. The second hinge mechanism is connected between the movable base and the bearing base. The first and second hinge mechanisms are connected to adjacent sides of the movable base. The switching member includes a main body slidably connected to the movable base in a switching direction, a second engaging portion engaged with or disengaged from the first engaging portion as the main body moves, and an interference portion entering or exiting the first hinge mechanism as the main body moves.

10 Claims, 11 Drawing Sheets

(56) References Cited

U.S. PATENT DOCUMENTS

| | | | |
|---|---|---|---|
| 2004/0246666 A1* | 12/2004 | Maskatia | G06F 1/1624 361/679.57 |
| 2007/0084014 A1* | 4/2007 | Tseng | G06F 1/1647 16/330 |
| 2009/0179435 A1* | 7/2009 | Lev | E05C 5/00 292/164 |
| 2009/0213536 A1* | 8/2009 | Lewandowski | G06F 1/1632 361/679.43 |
| 2012/0250283 A1* | 10/2012 | Travis | G06F 1/1622 361/807 |
| 2019/0250673 A1* | 8/2019 | Chen | G06F 1/1654 |

* cited by examiner

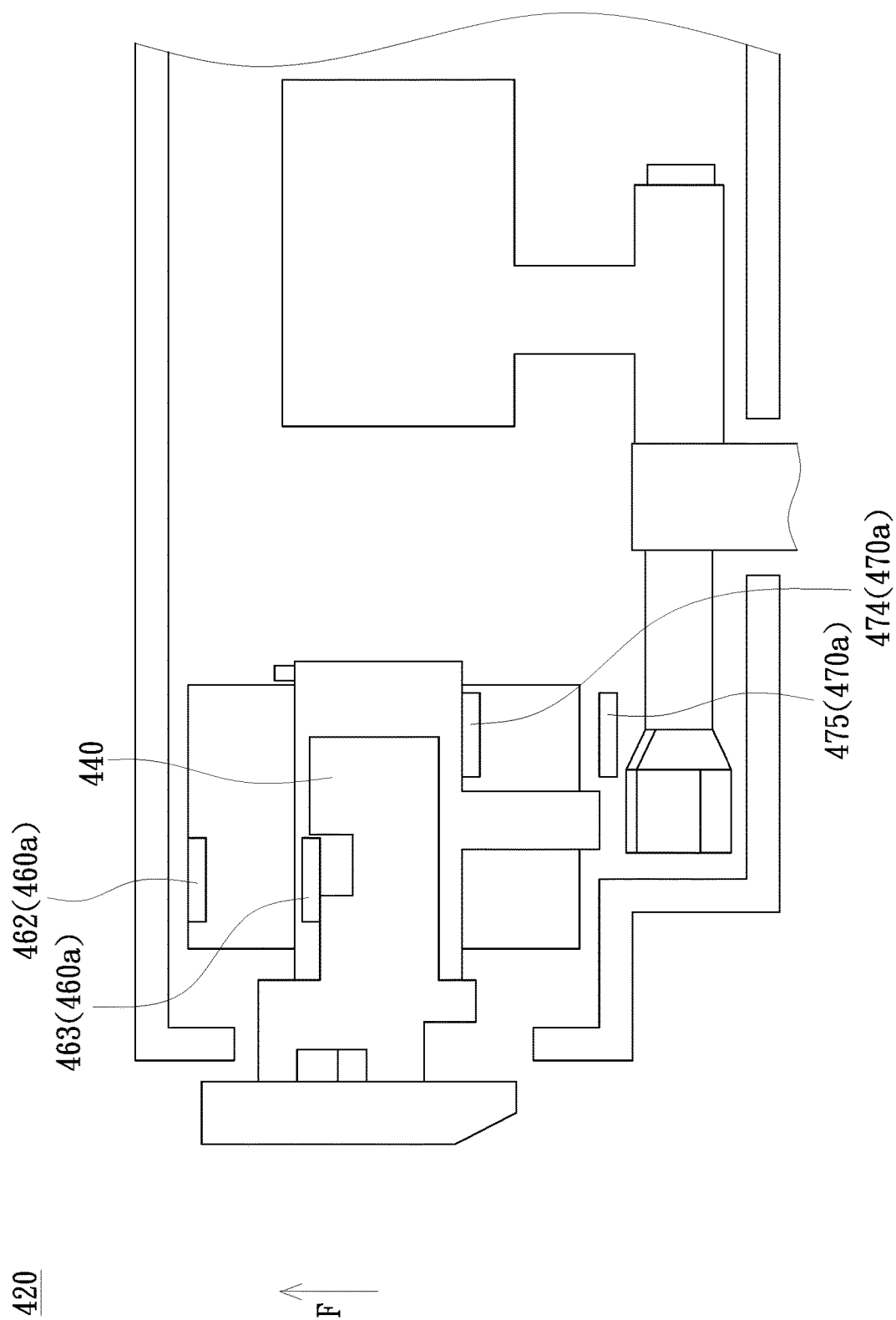

ELECTRONIC DEVICE

FIELD OF THE INVENTION

The present invention relates to an electronic device, and more particularly to an electronic device having a switchable usage mode.

BACKGROUND OF THE INVENTION

Foldable electronic devices such as notebook computers usually use a host as a bearing base, and the display is hinged to the host to be opened and closed to the host.

Users expect a larger display range with the rise of touch-sensitive displays in recent years, so a conventional notebook keyboard is converted into a touch-sensitive keyboard, and the host can also be used as another display when the keyboard is not used. Some foldable electronic devices can even flatten two bodies that are hinged to each other to form a large display. However, for a foldable electronic device, the length of the foldable electronic device in the longitudinal direction after the foldable electronic device is flattened will be too large to be viewed or read. In contrast, the two bodies arranged in the lateral direction are more convenient for the usage habits of ordinary people.

However, in order to design the foldable electronic device to be laterally juxtaposed, the hinge mechanism must be changed, and the design focus is on how to make the user intuitively operate when performing usage mode switching, while taking into account the stability of the structure.

SUMMARY OF THE INVENTION

The present invention provides an electronic device in which a user can intuitively operate a usage mode switching, and the structure remains stable during the usage mode switching.

The electronic device provided by the present invention includes a first body, a second body and a hinge assembly. The hinge assembly includes a bearing base, a movable base, a first hinge mechanism, a second hinge mechanism and a switching member. The bearing base is connected to the first body and provided with a first engaging portion. The first hinge mechanism is connected between the movable base and the second body. The second hinge mechanism is connected between the movable base and the bearing base. The first hinge mechanism and the second hinge mechanism are respectively connected to adjacent sides of the movable base. The switching member includes a main body, a second engaging portion connected to the main body, and an interference portion connected to the main body. The main body is slidably connected to the movable base in a switching direction away from and close to the first hinge mechanism. The second engaging portion is corresponding to the first engaging portion and adapted to engage with or disengage from the first engaging portion as a movement of the main body along the switching direction. The interference portion is adapted to enter or exit the first hinge mechanism as a movement of the main body.

In an embodiment of the invention, the bearing base has a bearing surface facing the movable base. The first engaging portion is recessed on the bearing surface and has a fastening hole and a first inclined surface respectively on opposite sides of the switching direction. The second engaging portion is a hook and has a second inclined surface. The second inclined surface is slidable along the switching direction on the first inclined surface to guide the hook of the second engaging portion to be disengaged from or engaged with the fastening hole of the first engaging portion.

In an embodiment of the invention, the hinge assembly further includes a coil spring disposed between the movable base and the switching member. The coil spring is connected to one end of the movable base and far from the first hinge mechanism than the switching member. The limiting mechanism includes a stop protrusion disposed on a limiting surface of the main body of the switching member, a fixing portion and a fulcrum portion disposed on the movable base, and an elastic limiting member. The elastic limiting member is bent and spans the fulcrum portion, and two ends of the elastic limiting member are respectively fixed to the fixing portion and contact the limiting surface.

In an embodiment of the invention, the hinge assembly further includes a first magnetic element, a second magnetic element, a third magnetic element and a fourth magnetic element. The first magnetic element is disposed on the movable seat and far from the first hinge mechanism than the switching member. The second magnetic element is disposed on the switching member and magnetically different from the first magnetic element. The third magnetic element is disposed on the movable base. The fourth magnetic element is disposed on the switching member and magnetically different from the third magnetic element. The fourth magnetic element is closer to the first hinge mechanism than the switching member.

In an embodiment of the invention, the first hinge mechanism includes a first hinge portion and a second hinge portion. The first hinge portion is connected to the movable base. The second hinge portion is connected to the second body and corresponding to the first hinge portion. The second hinge portion includes a fitting portion corresponding to the interference portion.

In an embodiment of the invention, the fitting portion is located at one end of the second hinge portion and has a flat shape. The interference portion is a hook that extends along the switching direction to the main body of the switching member.

In an embodiment of the invention, the bearing base and the movable base are two plates corresponding to each other. The movable base includes a hollow portion. The switching member is received in the hollow portion. The switching member further includes an operation portion. The movable base has an operation opening on a side away from the second hinge mechanism to communicate with the hollow portion. The operation portion is located outside the movable base and is connected to the main body of the switching member through the operation opening.

In an embodiment of the invention, a side of the movable base facing the bearing base has an engagement opening communicating with the hollow portion for allowing the second engaging portion to pass therethrough.

In an embodiment of the invention, the interference portion is away from the first hinge mechanism when the first engaging portion is engaged with the second engaging portion. The second engaging portion is disengaged from the first engaging portion when the interference portion enters the first hinge mechanism to lock the first hinge mechanism.

In an embodiment of the invention, the first body and the second body are respectively a display.

The electronic device of the present embodiment configures the hinge assembly between the first body and the second body. The first usage mode of the second body is the same as the usage mode of the conventional notebook computer. When it is required to switch the first usage mode to the second usage mode, the movable base can be disengaged from the bearing base and the second body is limited to rotate relative to the movable base by simply moving the switching member, so that the second body can stably rotate together with the movable base. When needing to return to the first usage mode, the switching member can automatically connect the movable base to the bearing base while releasing the rotation restriction on the second body by only simply turning the second body back. Therefore, the electronic device of the present embodiment can achieve structural stability when switching the usage mode, and the user can smoothly switch the usage mode.

In order to make the above and other objects, features and advantages of the present invention become more apparent and obvious, the preferred embodiments will be described in detail with reference to the accompanying drawings hereinafter.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a schematic diagram of a movable base and a switching member of an electronic device according to another embodiment of the present invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
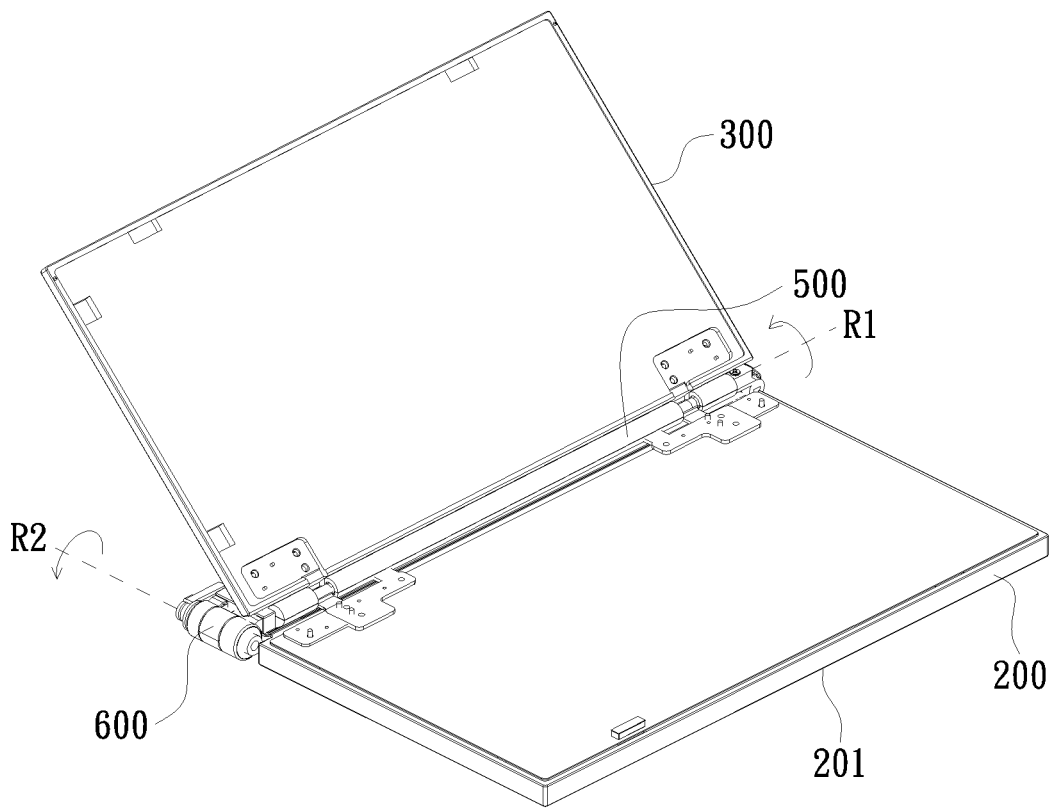
FIGS. 1A and 1B are schematic diagrams of an electronic device in a first usage mode according to an embodiment of the present invention.
Figure 1B:
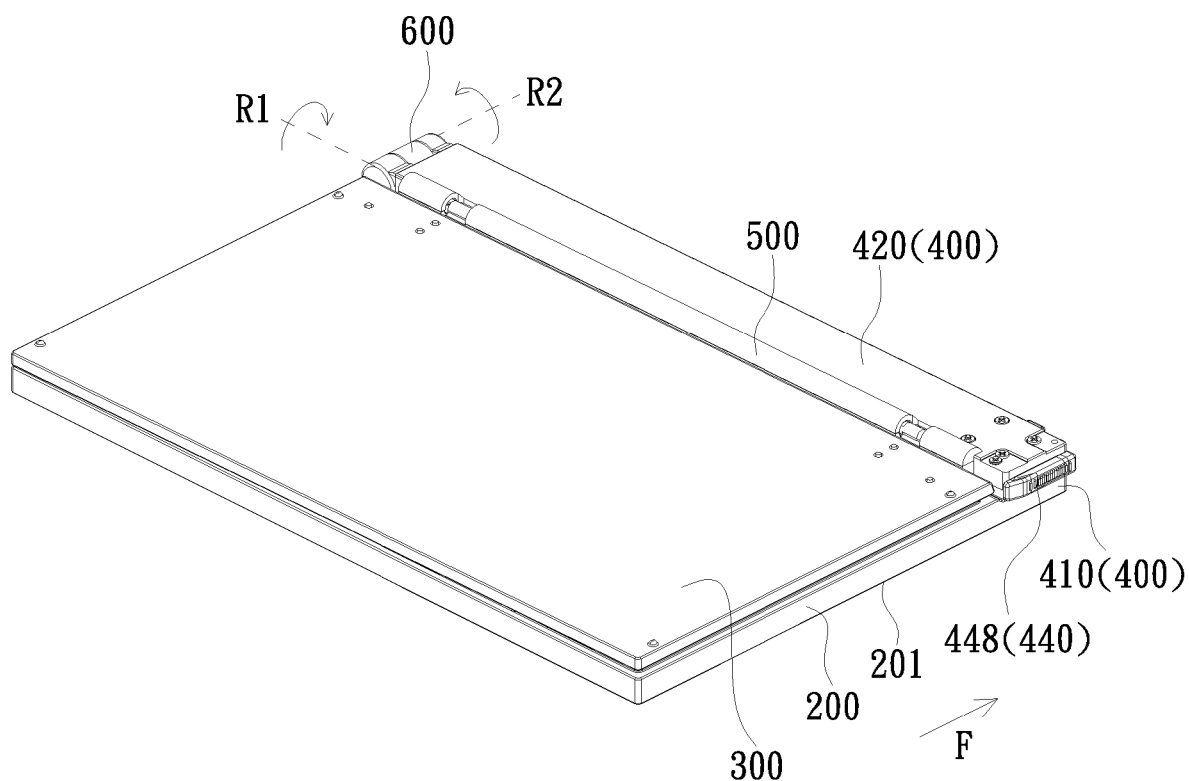
Figure 1C:
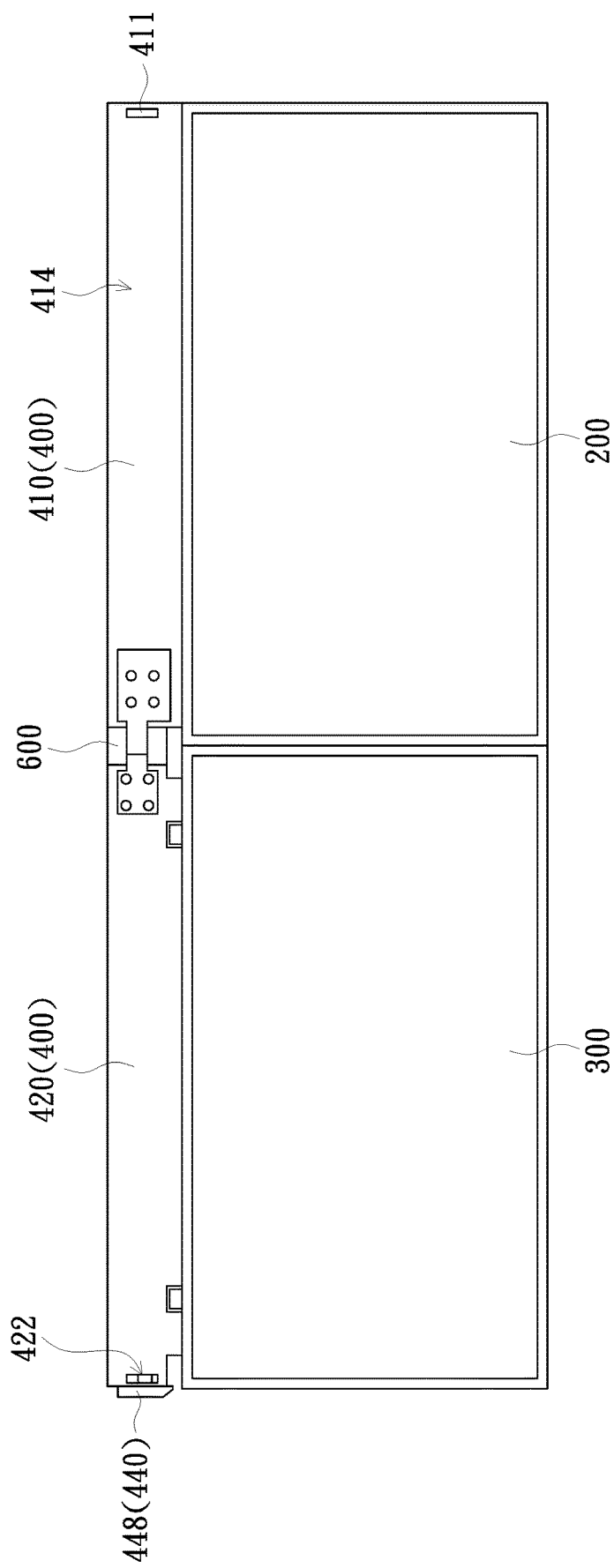
FIG. 1C is a schematic diagram of an electronic device in a second usage mode according to an embodiment of the present invention.
Figure 1D:
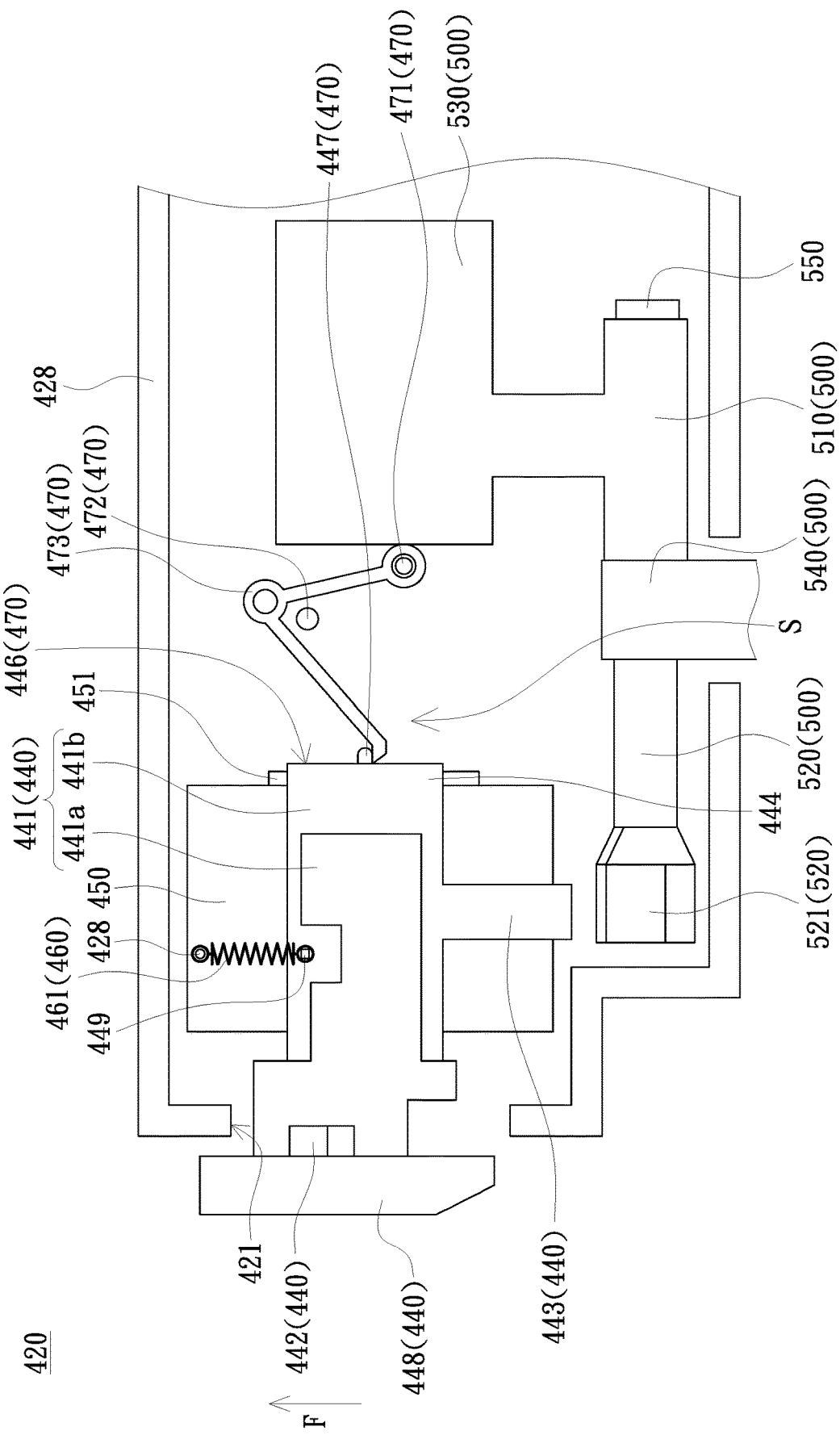
FIG. 1D is a schematic diagram of a movable base and a switching member of an electronic device in a first usage mode according to an embodiment of the invention.
Figure 1E:
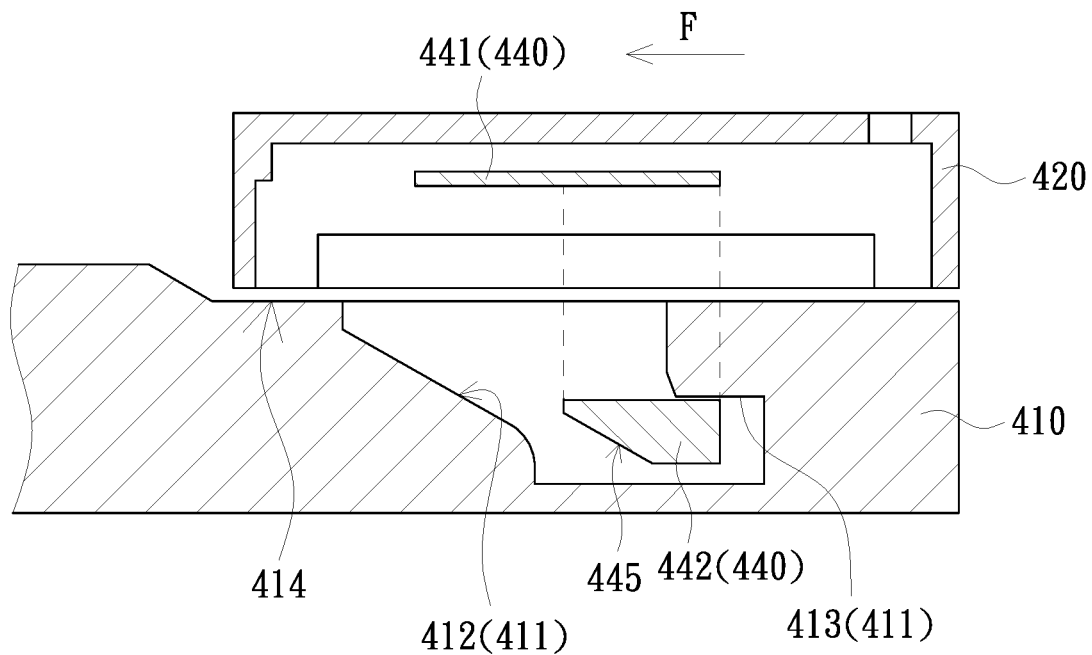
FIG. 1E is a schematic diagram of an operation between a movable base and a bearing base corresponding to FIG. 1D.
Figure 1F:
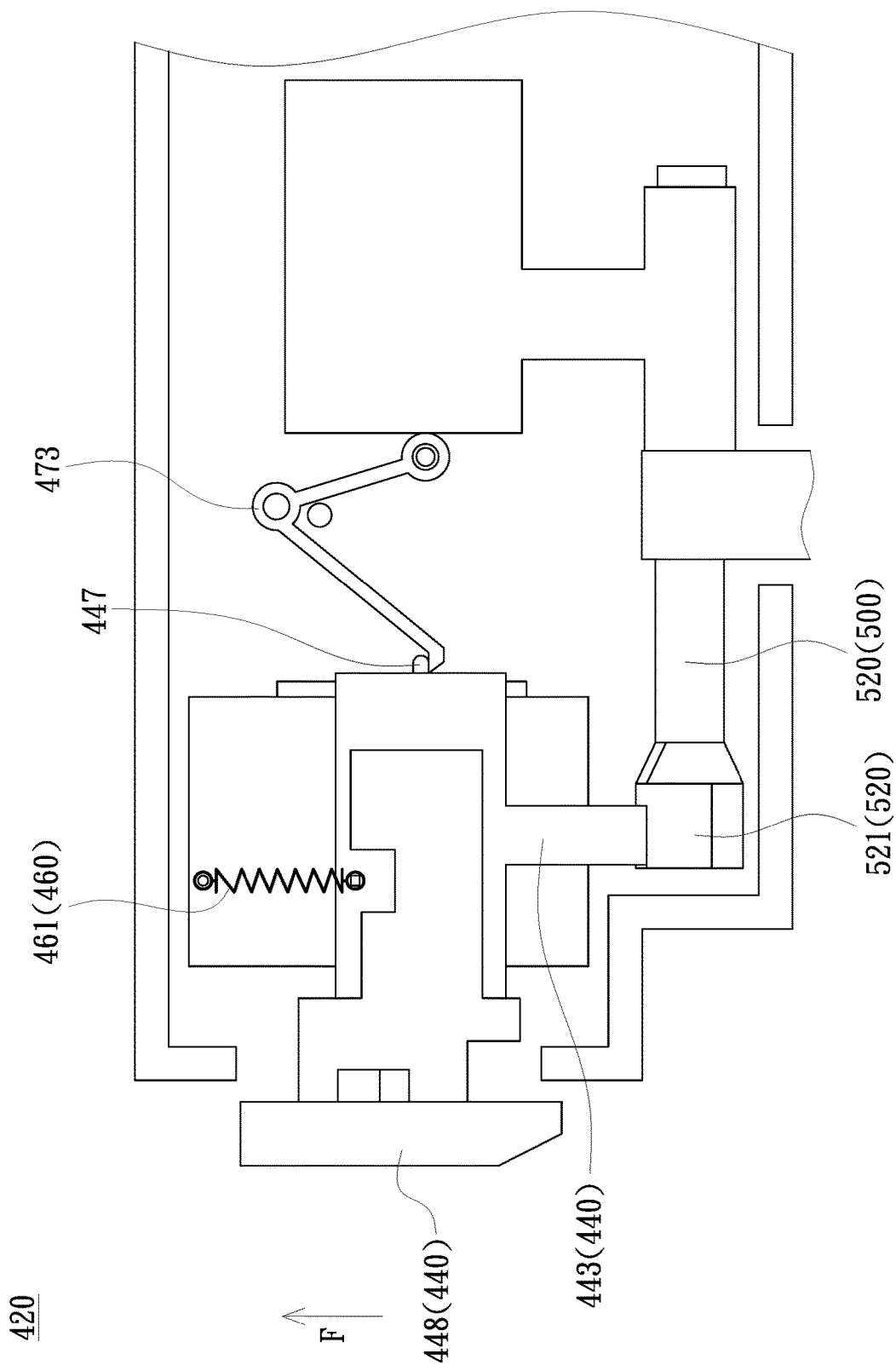
FIG. 1F is a schematic diagram of a switching member of an electronic device performing a switching according to an embodiment of the present invention.
Figure 1G:
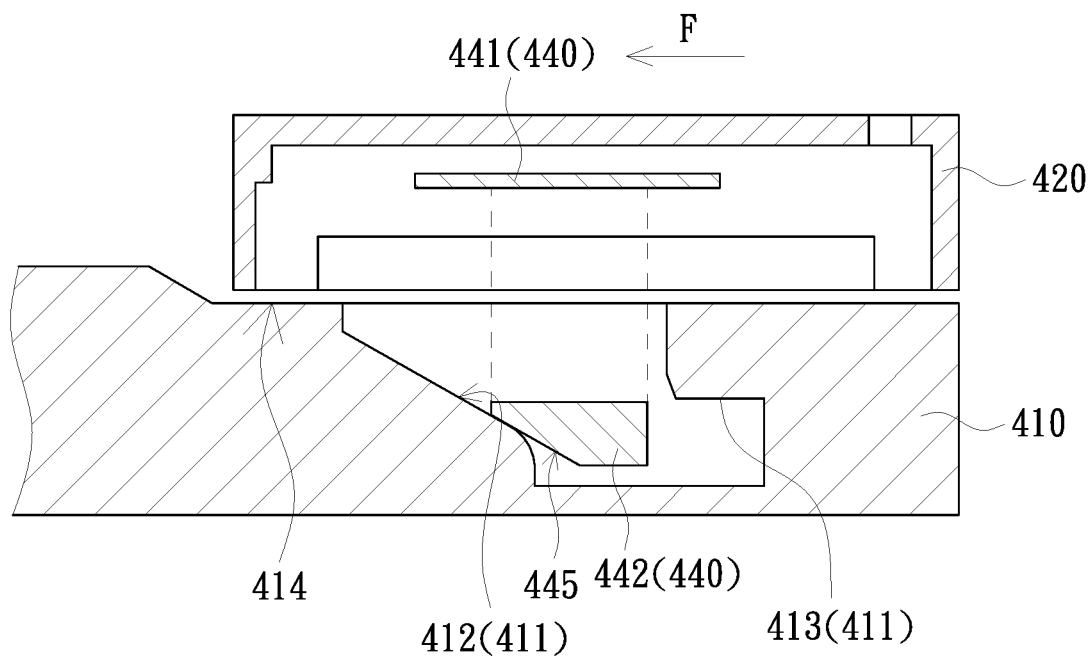
FIG. 1G is a schematic diagram of an operation between a movable base and a bearing base corresponding to FIG. 1F.
Figure 1H:
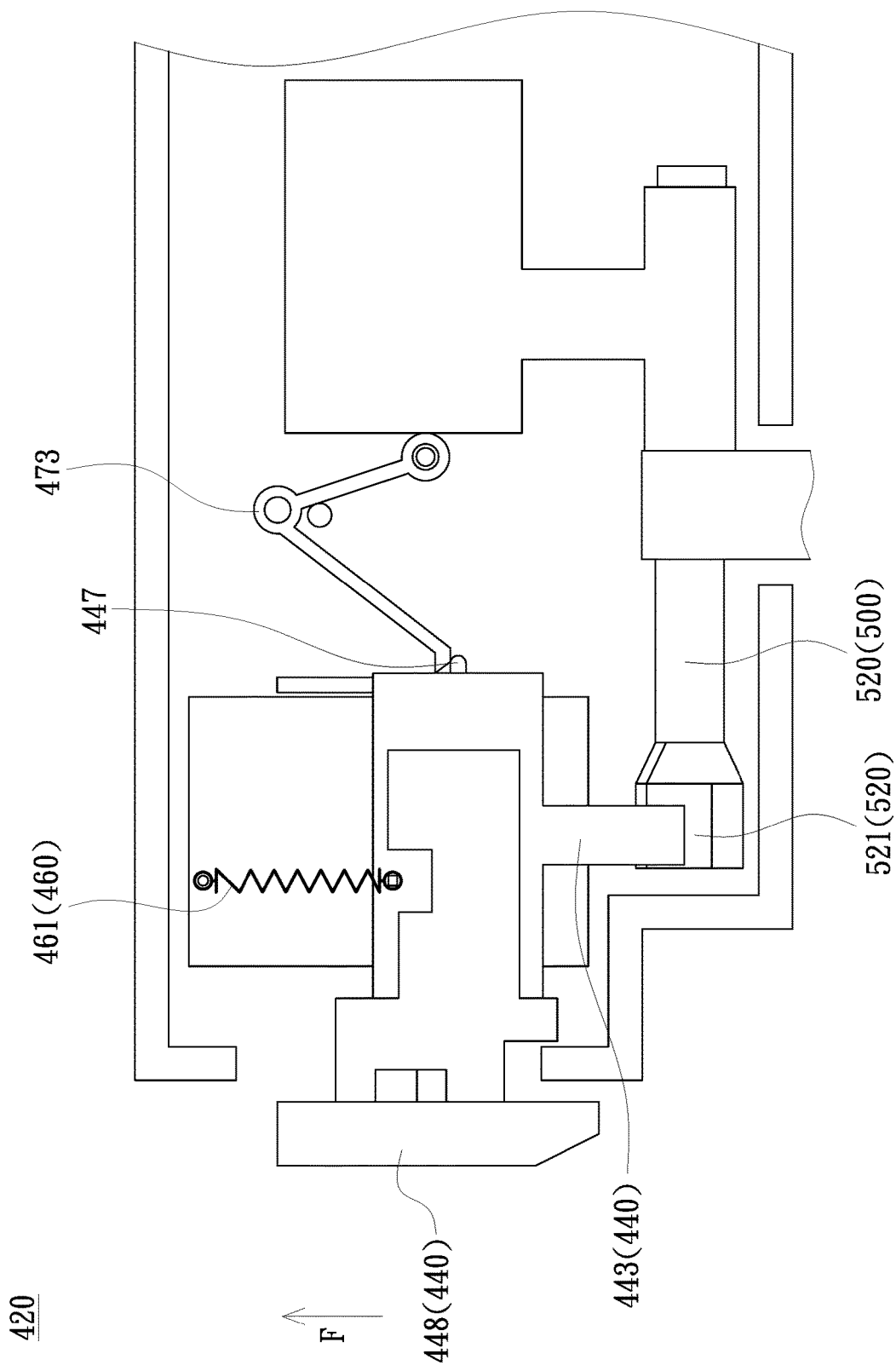
FIG. 1H is a schematic diagram of a movable base and a switching member of an electronic device in a second usage mode according to an embodiment of the present invention.
Figure 1I:
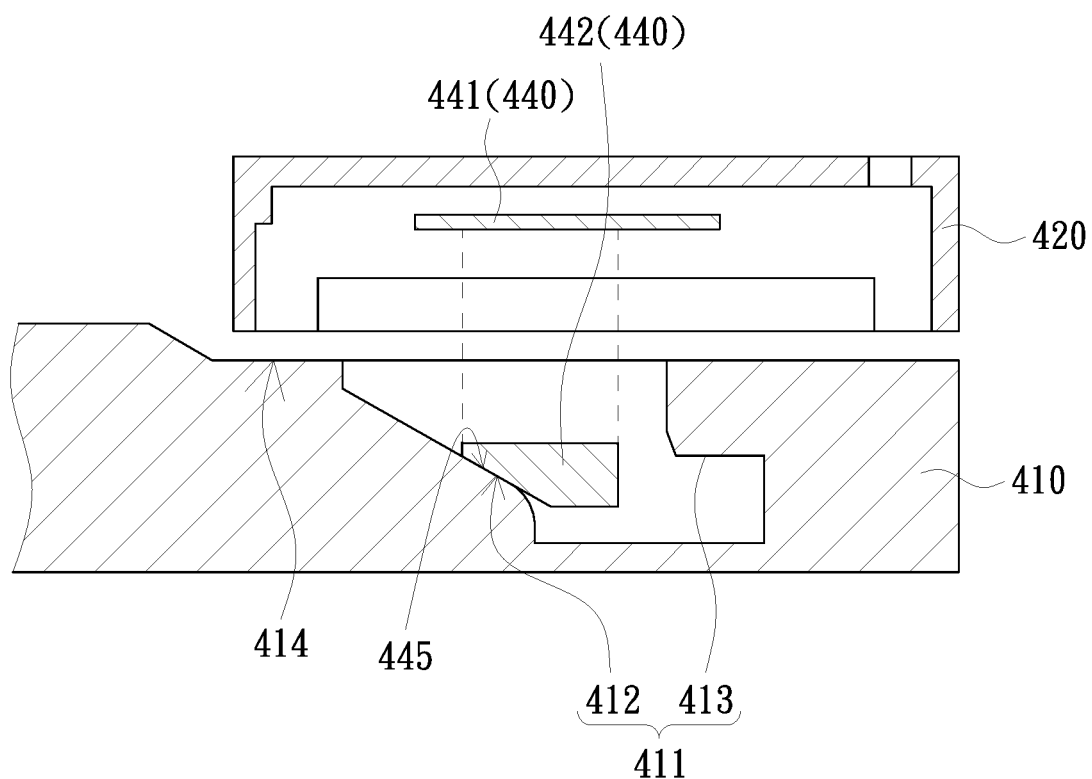
FIG. 1I is a schematic diagram of an operation between a movable base and a bearing base corresponding to FIG. 1H.
Figure 1J:
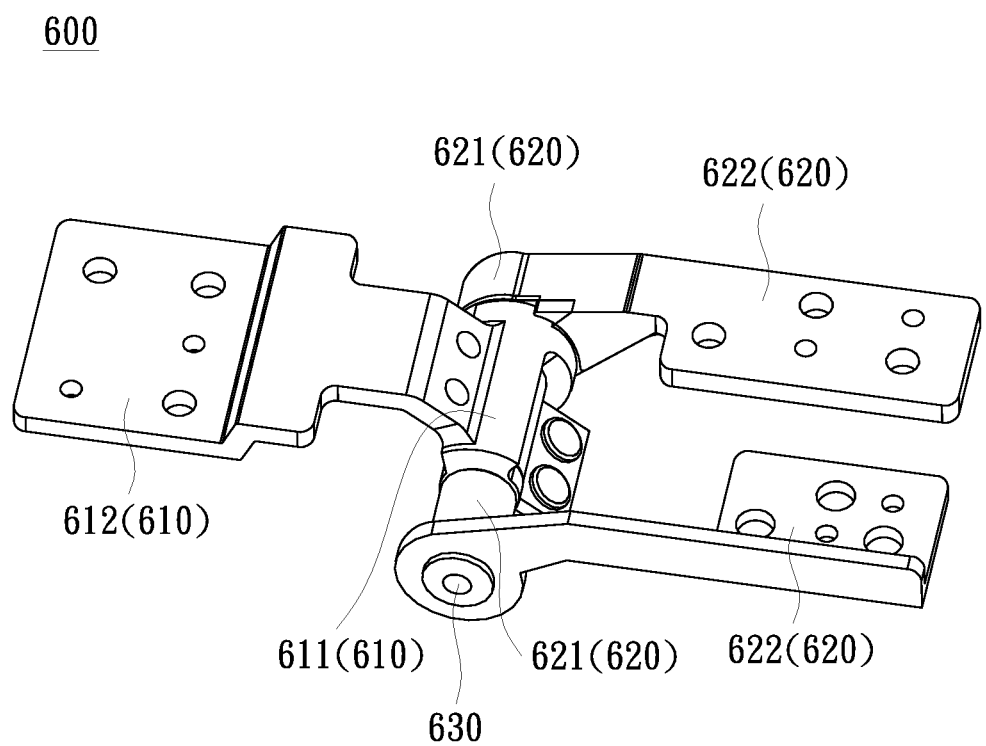
FIG. 1J is a schematic diagram of a second hinge mechanism according to an embodiment of the present invention.

FIGS. 1A and 1B are schematic diagrams of an electronic device in a first usage mode according to an embodiment of the present invention. FIG. 1C is a schematic diagram of an electronic device in a second usage mode according to an embodiment of the present invention. FIG. 1D is a schematic diagram of a movable base and a switching member of an electronic device in a first usage mode according to an embodiment of the invention. FIG. 1E is a schematic diagram of an operation between a movable base and a bearing base corresponding to FIG. 1D. FIG. 1F is a schematic diagram of a switching member of an electronic device performing a switching according to an embodiment of the present invention. FIG. 1G is a schematic diagram of an operation between a movable base and a bearing base corresponding to FIG. 1F. FIG. 1H is a schematic diagram of a movable base and a switching member of an electronic device in a second usage mode according to an embodiment of the present invention. FIG. 1I is a schematic diagram of an operation between a movable base and a bearing base corresponding to FIG. 1H. FIG. 1J is a schematic diagram of a second hinge mechanism according to an embodiment of the present invention. Referring to FIG. 1A to FIG. 1J, the electronic device 10 of the present embodiment includes a first body 200, a second body 300 and a hinge assembly 400. The electronic device 10 may be a notebook computer, and the first body 200 and the second body 300 both can be a display, and further can be a touch display, but are not limited thereto. The electronic device 10 of the present embodiment can have a first usage mode and a second usage mode by the configuration of the hinge assembly 400.

As shown in FIGS. 1A to 1C, the hinge assembly 400 includes a bearing base 410, a movable base 420, a first hinge mechanism 500, a second hinge mechanism 600 and a switching member 440. The bearing base 410 is connected to the first body 200 and is provided with a first engaging portion 411 on a bearing surface 414 facing the movable base 420. The first hinge mechanism 500 is connected between the movable base 420 and the second body 300. The second hinge mechanism 600 is connected between the bearing base 410 and the movable base 420. The first hinge mechanism 500 and the second hinge mechanism 600 are respectively connected to adjacent sides of the movable base 420. The first hinge mechanism 500 rotates about the first rotating axis R1, and the second hinge mechanism 600 rotates about the second rotating axis R2. Since the first hinge mechanism 500 and the second hinge mechanism 600 are respectively connected to adjacent sides of the movable base 420, the second rotating axis R2 can be perpendicular to the first rotating axis R1. The first engaging portion 411 may be disposed adjacent to one side of the bearing base 410 and far from the second hinge mechanism 600. In the present embodiment, the bearing base 410 and the first body 200 may include a common bottom plate 201. A portion of the bottom plate 201 is provided with internal components of the first body 200 and a housing covering the internal components, and the other portion is provided with the bearing base 410; however, the present invention is not limited thereto. The bearing base 410 and the first body 220 may also be connected by other structures. In the present embodiment, the bearing base 410 and the movable base 420 may be two plates having shapes and sizes corresponding to each other. The first hinge mechanism 500 is actuated when the electronic device 10 is in the first usage mode, and the second hinge mechanism 600 is actuated when the electronic device 10 is in the second usage mode.

As shown in FIGS. 1D and 1E, the switching member 440 includes a main body 441, a second engaging portion 442 connected to the main body 441 and corresponding to the first engaging portion 411, and an interference portion 443 connected to the main body 441. The main body 441 is slidably connected to the movable base 420 in a switching direction F away from and close to the first hinge mechanism 500. The movement of the main body 441 in the switching direction F allows the second engaging portion 442 to be engaged or disengaged from the first engaging portion 411 and allows the interference portion 443 to enter or exit from the first hinge mechanism 500.

In the present embodiment as shown in FIGS. 1D and 1E, the first engaging portion 411 is recessed on the bearing surface 414 and has a fastening hole 413 and a first inclined surface 412 respectively on opposite sides of the switching direction F. Specifically, the first engaging portion 411 has the fastening hole 413 on a side far from the first hinge mechanism 500 and has the first inclined surface 412 on a side close to the first hinge mechanism 500. The second engaging portion 442 is a hook and has a second inclined surface 445. The second inclined surface 445 is slidable along the switching direction F on the first inclined surface 412 to guide the second engaging portion 442 to be disengaged from or engaged with the fastening hole 413 of the first engaging portion 411.

In the present embodiment as shown in FIG. 1D, the first hinge mechanism 500 includes a first hinge portion 510 connected to the movable base 420 and a second hinge portion 520 connected to the second body 300 and corresponding to the first hinge portion 510. The second hinge portion 520 includes a fitting portion 521 corresponding to the interference portion 443. The second hinge portion 520 has a cylindrical shape. The fitting portion 521 may be located at one end of the second hinge portion 520 and has a flat shape. The interference portion 443 is a hook that extends along the switching direction F to the main body 441 of the switching member 440. In the first usage mode and when the second body 300 is closed to the first body 200, the interference portion 443 can move with the switching member 440 to the fitting portion 521 and abut against the fitting portion 521. Since the fitting portion 521 is not cylindrical, the second hinge portion 520 cannot be rotated when the fitting portion 521 is abutted by the interference portion 443, and therefore the second body 300 cannot be rotated by the first hinge mechanism 500. In addition, the fitting portion 521 can be rotated to an angle that can be abutted by the interference portion 443 only when the second body 300 is closed to the first body 200. When the second body 300 is first opened to the first body 200 by the first hinge mechanism 500, the interference portion 443 cannot be abutted against the fitting portion 521 even if the switching member 440 is moved.

In the present embodiment as shown in FIG. 1D, the first hinge mechanism 500 further includes a connecting sheet 530 connecting the first hinge portion 510 to the movable base 420, a connecting sheet 540 connecting the second hinge portion 520 to the second body 300, and a shaft 550. The first hinge portion 510 and the second hinge portion 520 are shaft sleeves annularly sleeved to the shaft 550, but are not limited thereto. In other embodiments (not illustrated), the first hinge mechanism 500 may also have a different structure.

In the present embodiment as shown in FIG. 1D, the surface of the movable base 420 for disposing the switching member 440 is provided with a fixing sheet 450. A sliding connecting structure may be disposed between the fixing sheet 450 and the main body 441 of the switching member 440. For example, one side of the fixing sheet 450 may be bent into a sliding rail 451, and one side of the main body 441 may be bent into a corresponding sliding groove 444, so that the switching member 440 is slidably connected to the movable base 420, but the invention is not limited thereto. In other embodiments (not illustrated), the movable base 420 and the switching member 440 may have other different sliding connecting structures.

In the present embodiment as shown in FIG. 1D, the main body 441 of the switching member 440 may include a first portion 441a provided with the second engaging portion 442 and a second portion 441b provided with the interference portion 443 and the sliding groove 444. The first portion 441a is stacked on the second portion 441b and joined to the second portion 441b by a coupling member (not shown) such as a screw. However, the form of the switching member 440 is not limited thereto, and the switching member 440 may also be, for example, an integrally-formed component.

In the present embodiment as shown in FIG. 1D, the hinge assembly 400 may further include a restoring mechanism 460 and a limiting mechanism 470. The restoring mechanism 460 is disposed between the movable base 420 and the switching member 440 to provide a restoring force for the switching member 440 to move away from the first hinge mechanism 500. The limiting mechanism 470 is also disposed between the movable base 420 and the switching member 440 to provide a maintaining force for the switching member 440 to approach the first hinge mechanism 500 against the restoring force.

In the present embodiment as shown in FIG. 1D, the restoring mechanism 460 includes a coil spring 461 disposed between the movable base 420 and the switching member 440. One end of the coil spring 461 is connected to the movable base 420, and one end of the coil spring 461 far from the first hinge mechanism 500 is connected to the movable base 420. The one end of the coil spring 461 connected to the movable base 420 is far from the first hinge mechanism 500 than the switching member 440. A convex pillar 428 may be disposed on the movable base 420 and a hook portion 449 may be disposed on the main body 441 of the switching member 440 to fix the two ends of the coil spring 461, respectively. The limiting mechanism 470 includes a stop protrusion 447 disposed on a limiting surface 446 of the main body 441 of the switching member 440 parallel to the switching direction F, a fixing portion 471 and a fulcrum portion 472 disposed on the movable base 420 and opposite to the limiting surface 446, and an elastic limiting member 473 disposed and assembled to the fixing portion 471 and the fulcrum portion 472. The elastic limiting member 473 can be bent, and the two ends thereof are respectively fixed to the fixing portion 471 and in contact with the limiting surface 446. The elastic limiting member 473 spans the fulcrum portion 472, which can serve as a fulcrum of the elastic limiting member 473 for providing the elastic force. The end of the elastic limiting member 473 contacting the limiting surface 446 can be abutted against the stop protrusion 447 in the second usage mode to prevent the switching member 440 from being away from the first hinge mechanism 500.

In the present embodiment as shown in FIGS. 1C and 1D, the movable base 420 may include a hollow portion S to accommodate the switching member 440, the switching member 440 may further include an operation portion 448, and the movable base 440 may have an operation opening 421 communicating with the hollow portion S on a side away from the second hinge mechanism 600. The operation portion 448 is located outside the movable base 440 and is connected to the main body 441 of the switching member 440 through the operation opening 421. The operation portion 448 may have, for example, a trapezoidal crosssection, and the surface thereof may be provided with a slip-resistant structure. In addition, as shown in FIG. 1C, the movable base 420 may have an engagement opening 422 allowing the second engaging portion 442 to pass therethrough on a side facing the bearing base 410.

As shown in FIGS. 1J and 1A, the second hinge mechanism 600 of the present embodiment includes a third hinge portion 610, two fourth hinge portions 620, and a shaft 630. The third hinge portion 610 may include a shaft sleeve 611 and a connecting sheet 612 connected to the shaft sleeve 611. Each of the fourth hinge portions 620 includes a shaft sleeve 621 and a connecting sheet 622 connected to the shaft sleeve 621. The shaft sleeve 611 is located between the two shaft sleeves 621. The shaft 630 passes through the shaft sleeve 621 and the shaft sleeve 611. In the present embodiment, the third hinge portion 610 is connected to the bearing base 410 by the connecting sheet 612, and the fourth hinge portion 620 is connected to the movable base 420 by the connecting sheet 622, but the invention is not limited thereto. For example, the third hinge portion 610 may be connected to the movable base 420, and the fourth hinge portion may be connected to the bearing base 410. In addition, the form of the second hinge mechanism 600 is not limited to the present embodiment.

As shown in FIGS. 1A, 1D and 1E, in the first usage mode, the second engaging portion 442 is engaged with the first engaging portion 411, so that the movable base 420 is fixed to the bearing base 410 and the interference portion 443 is away from the first hinge mechanism 500. At this time, the second body 300 can be opened or closed to the first body 200 by the first hinge mechanism 500.

As shown in FIGS. 1B and 1C, when the usage mode is to be switched, the second body 300 can be closed to the first body 200 first, and then the operation portion 448 is pulled to move the switching member 440. As shown in FIGS. 1F and 1G, at this time the switching member 440 moves to the first hinge mechanism 500, and the second engaging portion 442 is disengaged from the fastening hole 413 of the first engaging portion 411 and approaches the first inclined surface 412. When the second inclined surface 445 contacts the first inclined surface 412, the side of the movable base 420 away from the second hinge mechanism 600 is gradually pushed away from the bearing base 410, meanwhile the interference portion 443 of the switching member 440 in the movable base 420 gradually enters the first hinge mechanism 500, one end of the elastic limiting member 473 starts to abut against the stop protrusion 447, and the user can feel some resistance when pulling the operation portion 448.

As shown in FIGS. 1H and 1I, when one end of the elastic limiting member 473 has completely passed the stop protrusion 447, the movable base 420 can be slightly raised to have an angle of 0.2 and 0.3 degrees with respect to the bearing base 410. At this time, the interference portion 443 has locked the first hinge mechanism 500. Therefore, the switching member 440 does not rebound due to the stop of the elastic limiting member 473 even if the user releases the operation portion 448. At this time, the movable base 420 can be rotated relative to the bearing base 410 by the second hinge mechanism 600 and drive the second body 300 to be opened or closed to the first body 200. As shown in FIG. 1C, the second body 300 can be rotated together with the movable base 420 to be opened to the first body 200. In the present embodiment, the movable base 420 can be rotated 180 degrees relative to the bearing base 410 by the second hinge mechanism 600; as such, the second body 300 can be juxtaposed to the first body 200 to bring the electronic device 10 into the second usage mode.

The electronic device 10 is returned from the second usage mode to the first usage mode by directly turning back the second body 300 in FIG. 1C to the first body 200. When turning to a specific angle, as shown in FIG. 1F, one end of the elastic limiting member 473 in the movable base 420 will pass the stop protrusion 447 in a direction away from the first hinge mechanism 500, thereby causing the limiting mechanism 470 to fail. At this time, the restoring force provided by the restoring mechanism 460 can automatically pull away the interference portion 443 of the switching member 440 from the first hinge mechanism 500 and cause the second engagement portion 442 to be engaged back to the first engaging portion 411, thereby re-engaging the movable base 420 to the bearing base 410.

The electronic device 10 of the present embodiment configures the hinge assembly 400 between the first body 200 and the second body 300. The first usage mode of the second body 300 is the same as the usage mode of the conventional notebook computer. When it is required to switch the first usage mode to the second usage mode, the movable base 420 can be disengaged from the bearing base 410 and the second body 300 is limited to rotate relative to the movable base 420 by simply moving the switching member 440, so that the second body 300 can stably rotate together with the movable base 420. When needing to return to the first usage mode, the switching member 440 can automatically connect the movable base 420 to the bearing base 410 while releasing the rotation restriction on the second body 300 by only simply turning the second body 300 back. Therefore, the electronic device 10 of the present embodiment can achieve structural stability when switching the usage mode, and the user can smoothly switch the usage mode.

FIG. 2 is a schematic diagram of a movable base and a switching member of an electronic device according to another embodiment of the present invention. Referring to FIG. 2, the present embodiment is substantially the same as the embodiment of FIGS. 1A to 1J except that the restoring mechanism 460a and the limiting mechanism 470a of the present embodiment employ magnetic elements.

In the present embodiment, the restoring mechanism 460a includes a first magnetic element 462 disposed on the movable base 420 and a second magnetic element 463 disposed on the switching member 440, wherein the magnetism of the first magnetic element 462 is different from that of the second magnetic element 463, and the first magnetic element 462 is far from the first hinge mechanism 500 than the switching member 440. The limiting mechanism 470a includes a third magnetic element 475 disposed on the movable base 420 and a fourth magnetic element 474 disposed on the switching member 440, wherein the magnetism of the third magnetic element 475 is different from that of the fourth magnetic element 474, and the third magnetic element 475 is closer to the first hinge mechanism 500 than the switching member 440. The first magnetic element 462, the second magnetic element 463, the third magnetic element 474, and the fourth magnetic element 475 may be, for example, magnets.

When the switching member 440 moves along the switching direction F and is closer to the first hinge mechanism 500, the limiting force of the limiting mechanism 470a is greater than the restoring force of the restoring mechanism 460a, and therefore the switching member 440 can automatically approach the first hinge mechanism 500. Conversely, the switching member 440 will move away from the first hinge mechanism 500.

The electronic device of the present embodiment configures the hinge assembly between the first body and the second body. The first usage mode of the second body is the same as the usage mode of the conventional notebook computer. When it is required to switch the first usage mode to the second usage mode, the movable base can be disengaged from the bearing base and the second body is limited to rotate relative to the movable base by simply moving the switching member, so that the second body can stably rotate together with the movable base. When needing to return to the first usage mode, the switching member can automatically connect the movable base to the bearing base while releasing the rotation restriction on the second body by only simply turning the second body back. Therefore, the electronic device of the present embodiment can achieve structural stability when switching the usage mode, and the user can smoothly switch the usage mode.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic device, comprising a first body, a second body and a hinge assembly, wherein the hinge assembly comprises:
    a bearing base, connected to the first body and provided with a first engaging portion;
    a movable base;
    a first hinge mechanism, connected between the movable base and the second body;
    a second hinge mechanism, connected between the movable base and the bearing base, wherein the first hinge mechanism and the second hinge mechanism are respectively connected to adjacent sides of the movable base; and
    a switching member, comprising a main body, a second engaging portion connected to the main body, and an interference portion connected to the main body, wherein the main body is slidably connected to the movable base in a switching direction away from and close to the first hinge mechanism, the second engaging portion is corresponding to the first engaging portion and adapted to engage with or disengage from the first engaging portion as a movement of the main body along the switching direction, and the interference portion is adapted to enter or exit the first hinge mechanism as a movement of the main body.

2. The electronic device according to claim 1, wherein the bearing base has a bearing surface facing the movable base, the first engaging portion is recessed on the bearing surface and has a fastening hole and a first inclined surface respectively on opposite sides of the switching direction, the second engaging portion is a hook and has a second inclined surface, the second inclined surface is slidable along the switching direction on the first inclined surface to guide the hook of the second engaging portion to be disengaged from or engaged with the fastening hole of the first engaging portion.

3. The electronic device according to claim 1, wherein the hinge assembly further comprises a coil spring disposed between the movable base and the switching member, the coil spring is connected to one end of the movable base and far from the first hinge mechanism than the switching member, the limiting mechanism comprises a stop protrusion disposed on a limiting surface of the main body of the switching member, a fixing portion and a fulcrum portion disposed on the movable base, and an elastic limiting member, the elastic limiting member is bent and spans the fulcrum portion, and two ends of the elastic limiting member are respectively fixed to the fixing portion and contact the limiting surface.

4. The electronic device according to claim 1, wherein the hinge assembly further comprises a first magnetic element, a second magnetic element, a third magnetic element and a fourth magnetic element, the first magnetic element is disposed on the movable seat and far from the first hinge mechanism than the switching member, the second magnetic element is disposed on the switching member and magnetically different from the first magnetic element, the third magnetic element is disposed on the movable base, the fourth magnetic element is disposed on the switching member and magnetically different from the third magnetic element, and the fourth magnetic element is closer to the first hinge mechanism than the switching member.

5. The electronic device according to claim 1, wherein the first hinge mechanism comprises a first hinge portion and a second hinge portion, the first hinge portion is connected to the movable base, the second hinge portion is connected to the second body and corresponding to the first hinge portion, and the second hinge portion comprises a fitting portion corresponding to the interference portion.

6. The electronic device according to claim 5, wherein the fitting portion is located at one end of the second hinge portion and has a flat shape, and the interference portion is a hook that extends along the switching direction to the main body of the switching member.

7. The electronic device according to claim 1, wherein the bearing base and the movable base are two plates corresponding to each other, the movable base comprises a hollow portion, the switching member is received in the hollow portion, the switching member further comprises an operation portion, the movable base has an operation opening on a side away from the second hinge mechanism to communicate with the hollow portion, and the operation portion is located outside the movable base and is connected to the main body of the switching member through the operation opening.

8. The electronic device according to claim 7, wherein a side of the movable base facing the bearing base has an engagement opening communicating with the hollow portion for allowing the second engaging portion to pass therethrough.

9. The electronic device according to claim 1, wherein the interference portion is away from the first hinge mechanism when the first engaging portion is engaged with the second engaging portion, and the second engaging portion is disengaged from the first engaging portion when the interference portion enters the first hinge mechanism to lock the first hinge mechanism.

10. The electronic device according to claim 1, wherein the first body and the second body are respectively a display.

* * * * *